United States Patent [19]

Hojo et al.

[11] Patent Number: 4,788,080
[45] Date of Patent: Nov. 29, 1988

[54] PROCESS AND APPARATUS FOR COATING PARTICLES WITH FINE POWDER

[75] Inventors: Junichi Hojo, Boucherville; Serge Dallaire, Longueuil; Blaise Champagne, Boucherville, all of Canada

[73] Assignee: Canadian Patents and Development Limited, Ottawa, Canada

[21] Appl. No.: 42,715

[22] Filed: Apr. 27, 1987

[51] Int. Cl.$^4$ .......................... B05D 7/24; B05D 1/00
[52] U.S. Cl. .................................... 427/204; 427/202; 427/205; 427/226; 427/221; 427/213; 427/214; 427/215; 427/216
[58] Field of Search ............... 427/202, 204, 205, 227, 427/213, 226, 214, 218, 221, 215, 216

[56] References Cited

U.S. PATENT DOCUMENTS

| | | | |
|---|---|---|---|
| 2,871,774 | 2/1959 | Johnson | 427/214 X |
| 2,890,969 | 6/1959 | Schossberger et al. | 427/202 X |
| 2,977,864 | 4/1961 | Pullar | 427/214 X |
| 3,035,003 | 5/1962 | Kessler | 427/214 |
| 3,175,935 | 3/1965 | Vanstrum | 427/202 X |
| 3,672,945 | 6/1972 | Taylor | 427/214 X |
| 3,873,346 | 3/1975 | Sweeny | 427/214 X |
| 4,493,875 | 1/1985 | Beck et al. | 427/202 |
| 4,621,024 | 11/1986 | Wright | 427/214 X |

Primary Examiner—Shrive Beck
Attorney, Agent, or Firm—Alan A. Thomson

[57] ABSTRACT

There is disclosed a process for coating particles, such as ceramic, metallic and organic cores, with fine powder, such as ceramic, metal, organic or carbon powder. The process comprises providing a mixture comprising the particles and a binder which is capable of slowly melting to viscous state. Then the mixture is tumbled while slowly heating it to enable the binder to reach the viscous state while allowing the particles to be substantially covered with the binder. The next step includes cooling the mixture to about room temperature and thereafter breaking up the particles that may have agglomerated during the tumbling and heating to give individual particles covered with the binder. As a final step, the fine powder is added to the individual binder covered particles and the mixture is tumbled and heated again to the viscous state under conditions effective to provide a coating of the fine powder on the particles. Additional heating may be carried out to remove the binder and leave particles exclusively coated with the fine powder. The apparatus includes a rotating cylinder, heating and cooling means. The resulting product has a more uniform microstructure and higher bonding strength than a product resulting from a conventional mixing of ingredients.

19 Claims, 3 Drawing Sheets

PROCESS AND APPARATUS FOR COATING PARTICLES WITH FINE POWDER

This invention relates to a process and an apparatus for coating particles such as ceramic, metal and organic cores, with fine powder, such as metal, ceramic or organic powder. More particularly, the present invention is concerned with a process of preparing cores coated with fine powder, the resulting product having a more uniform microstructure and higher bonding strength than a product resulting from a conventional mixing of the components.

In the production of composites containing a dispersion of particles, a uniform dispersion of particles and a strong adhesion of these particles to the matrix are required for the making of high performance composites.

Various techniques have been reported for the production of metal or ceramic coating on metal or ceramic cores:
1. Physical or chemical vapor deposition;
2. Electro- or electroless plating:
3. Precipitation of salts or hydroxides from solutions and their reduction or decomposition;
4. Surface reaction of particles; and
5. Solid state sintering of particles.

Vapor deposition gives tight coatings of metals and ceramics (oxides, carbides, nitrides etc.), however, thick coatings are difficult to make or take a long time. Furthermore, these kinds of coatings are limited to some materials having appropriate evaporation or reaction rate. Plating is a popular method but the type of coating is limited to metals such as Ni, Co, Fe, Cr, Cu, etc., and the coating is usually thin. Precipitation based on decomposition techniques is applicable only to coatings of oxides which can be reduced by hydrogen. Surface reaction leads to protective layers on the surface of particles by oxidation, carburization, nitridation and so on. However, these techniques are also limited by the kind of coating material and the thickness. Sintering is based on the adhesion of powders on the surface of the particles. In this case the uniformity of coatings seems to be a problem because it depends on the condition used for the mixing of the particles and on the diffusion of the constituents.

U.S. Pat. No. 3,492,379, issued Jan. 27, 1970, inventor G. B. Redding discloses particles of nuclear fuel which have been coated with a thermosetting resin having powdered graphite incorporated therein. Before coating, powdered graphite is mixed with the resin powder to make the mixed powders flowable without difficulty. The coating is essentially based on the set resin having carbon particles dispersed therein and there is no possibility to remove the resin while retaining only the carbon particles on the particles of nuclear fuels.

It is an object of the present invention to provide a process in which there is no limitation in terms of cores and coating materials.

It is another object of the present invention to provide a process for coating particles which enables to achieve a very thick coating of fine powder.

It is another object of the present invention to provide a coating process which is simple and at the same time gives tough coatings, consolidated around cores.

It is another object of the present invention to provide coated cores which are not only useful for making composites containing a dispersion of particles, but may also be used to make porous composites and plasma or flame spray composite powders.

In accordance with the present invention, there is provided a process for coating particles with fine powder which comprises providing a mixture comprising the particles and a binder which is capable of slowly melting to viscous state. Then, the mixture is tumbled while slowly heating same to enable the binder to reach the viscous state while allowing the particles to be substantially covered with the binder. The next step includes cooling the mixture substantially to room temperature and thereafter breaking up particles that may have agglomerated during the tumbling and heating, to give individual particles covered with the binder. As a final step, the fine powder is added to the individual particles covered with the binder and the mixture is tumbled and heated again to the viscous state under conditions effective to provide a coating of the fine powder on the particles.

In accordance with a preferred embodiment of the present invention, the coated particles could be heated further to remove the binder leaving the particles exclusively coated with the fine powder.

The particles preferably consist of plastic or ceramic cores, for example, they are particles of $Al_2O_3$ and SiC or any suitable plastic material, or consist of metallic cores, such as particles selected from one of the element groups IVB, VB, VIB, VIII, IB, IIB, IIIA and IVA and alloys thereof.

The particles have a preferred mean diameter of about 40–5000 $\mu$m.

In accordance with a preferred embodiment of the invention, the fine powder includes fine metal powders, a ceramic powder, carbon powder, or plastic powder.

They are preferably selected from the element groups IVB, VB, VIB, VIIB, VIII, IB, IIB, IIIA and IVA and alloys thereof and have a preferred diameter of 0.1–10 $\mu$m.

In accordance with a preferred embodiment of the invention, a surfactant is added to fine powder to inhibit its agglomeration when coating the particles with the fine powder. The preferred surfactant comprises aluminum stearate.

Although any suitable binder can be used the preferred binder is polyethylene glycol or paraffin, such as CARBOWAX TM (Fisher Scientific Polyethylene Glycol 3350 technical grade) and PARVAN TM 52 and 67 (Esso Imperial oil paraffin).

In accordance with a preferred embodiment of the invention tumbling is preferably carried out in a rotating cylindrical container which is tilted with respect to the horizontal axis.

The ranges of ingredients may vary to a large extent. However, it has been found suitable to add about 5 to about 30 volume percent of the fine powder with respect to the volume of particles, preferably about 10 to about 15 volume percent.

On the other hand, the mixture of particles and binder may comprise about 0.5 to about 5 weight percent binder, preferably about 1 to 2 weight percent binder.

Both heating steps are usually carried out up to a temperature of about 80° C., preferably about 60° C.

Although any cooling means may be used, it is preferred that cooling be carried out by air blowing while the cylinder is rotating.

Whenever a surfactant is used, it is preferably added in an amount less than about 0.5 weight percent, most preferably less than about 0.1 weight percent.

According to the invention, an apparatus for coating particles with fine powder may comprise a frame, a rotating cylinder mounted on the frame tilted with respect to the horizontal axis, an inlet in the cylinder for introducing material therein, means to cause rotation of the rotating cylinder, means for slowly heating the rotating cylinder, and means for cooling the heated content of said rotating cylinder to room temperature.

The invention is illustrated by means of the following drawing, in which.

Various experiments were made using different materials, conditions and apparatus and these will first be discussed. It is understood however, that this invention is not to be restricted by the examples and that it should only be limited by the appended claims.

MATERIALS $Al_2O_3$ (Matfer Inc.: Corundum TM 60 grit) and Sic (Norton: Carborundum TM 24 grit, Fisher Scientific: Carborundum TM 150 and 320 grit) particles were used as cores. These ceramic cores have an irregular shape.

Al, Cr, Co, Mo and W (Cerac Inc.), Al (Alcan Aluminum Corp., Grade 105), Ni (Sherritt Gordon Mines Limited, Grade NF-1M) and Fe (Quebec Metal Powders, Atomet 95) powders were used as coating constituents. Al (Cerac) powder contains flake. Al (Alcan) and Fe powders are nodular. Cr, Ni, Co, Mo and W powders are granular.

Carbowax TM (Fisher Scientific, Polyethylene glycol 3350 Technical grade) and paraffin (Esso Imperial Oil; Parvan TM 52 and 67) were used as binders. The melting point of Carbowax TM is 58° C. and its freezing point is 48° C., according to the measurement made by the inventors. Paraffins (ESSO Imperial Oil: Parvan TM 52 and 67) have a melting point of 52° C. and 67° C., respectively. Al-stearate (Sargent-Welch Scientific, technical grade) may be added to fine metal powders in order to prevent their agglomeration.

APPARATUS

Figure 1:
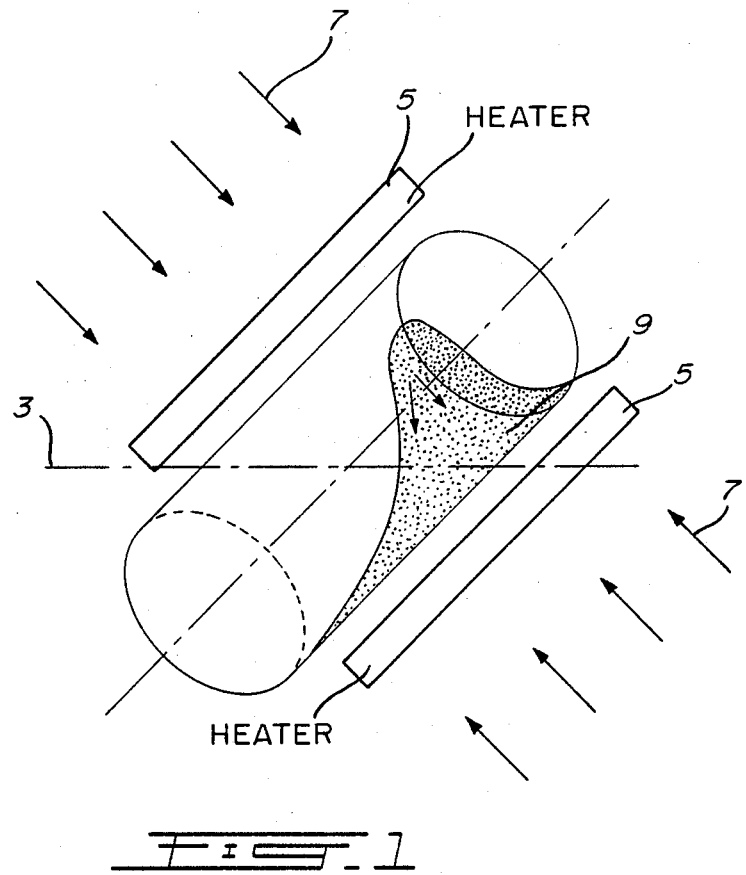
FIG. 1 is a schematic illustration of an apparatus adapted to coat particles according to the invention.

A cylindrical container, made from acrylic glass, was used for coating. The apparatus is schematically illustrated in FIG. 1. It consists of a cylinder which is tilted with respect to the horizontal axis 3. Heating means 5 are provided to heat the content of the cylinder to a suitable temperature and air cooling means 7 enable to cool the heated content to room temperature. During the rotation, the powder mass 9 moves in both circular and axial directions along the length of the cylinder which reduces the tendency of powder accumulation at the ends of the cylinder, often causing the formation of large agglomerates.

Two cylinders with different sizes were used: cylinder I (45 mm I.D.×95 mm) and cylinder II (50 mm I.D.×125 mm). The cylinder I was heated by means of an air blower and cylinder II by means of an electric heating band. The temperature inside the cylinder was measured with a Cu/Fe-Ni thermocouple.

Figure 4:
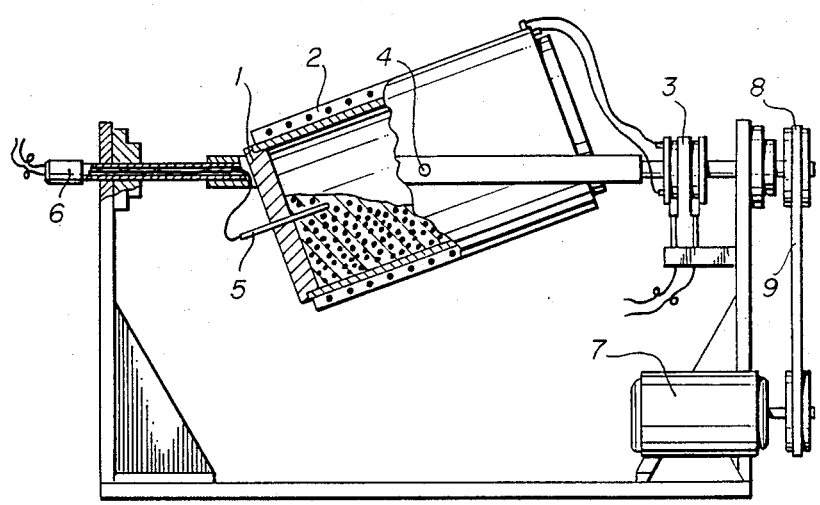
FIG. 4 shows an apparatus for coating particles with fine powder.

An apparatus for coating particles with fine powder which comprises (as shown in FIG. 4):

(a) a coating chamber (1) which consists of a cylindrical container the length to diameter ratio of which is between 1:1 to 5:1 and having (b) a heating means (2) comprising one of
 (1) an electrical heating element which is wound around the chamber (1). Electrical current is provided to this heating element by an electrical power slip-ring (3) located on the horizontal axis;
 (2) a jacket surrounding the coating chamber. A hot fluid (water, oil) flowing around the coating chamber heats the coating chamber and its content to the suitable temperature. Fluid flow is allowed to circulate by means of a rotating joint located on the horizontal axis.

(c) a frame (4) on which is mounted said coating chamber tilted with respect to the horizontal axis;

(d) a means for cooling said coating chamber such that when an electrical heating element is used in (b) (1) the cooling chamber, and when the jacket is used in (b) (2) the cooling means comprises a cooling fluid flowing around said coating chamber in said jacket;

(e) a thermocouple (5) located inside said coating chamber (1) to measure the temperature of said coating chamber and connected via a thermocouple slip-ring (6) to a controller which controls the temperature rise of said coating chamber and its contents;

(f) a means to cause rotation of the coating cylinder. It can merely consist of an electrical motor (7) coupled to the rotating axis by means of pulleys (8) and a belt (9) or gears. The rotation speed can be adjusted and controlled by means of a rheostat.

COATING PROCESS

The general procedure consists of adding particles to be coated and the binder to container 1. The container is first rotated followed by heating until the binder becomes viscous. Then the mixture is cooled and the agglomerated particles are broken up by adding balls to the container. The fine powder is then added to the particles in the container and the mixture is heated to provide a coating of the fine powder on the particles. If particles coated with fine powder, without binder is required, binder could be removed by heating. In some cases, Al-stearate is added to prevent the agglomeration of the fine powder.

Binder-coated ceramic cores and metal powders were charged into the cylinder. The cylinder was then heated and rotated simultaneously. The following process parameters were used:

| | |
|---|---|
| Content of binder | 5 wt % (based on ceramic cores). |
| Charge of metal particles | 20 to 60 vol. % (Me/Me + ceramics). |
| Filling of cylinder | 5 to 10 vol. %. |
| Tilt angle | 30° or 45°. |
| Rotation speed | 40 rpm. |
| Temperature | 60 to 85° C. |
| Heating time | 300 s for cylinder I; 600 s for cylinder II. |
| Agglutination time | 300 s for cylinder I: 600 s for cylinder II. |
| Cooling | Air blowing while cylinder rotating. |

Metal-coated ceramic cores were separated from free metal powders by sieving. The proportion of the coating was determined by weight measurements.

The size distribution of ceramic cores was measured by sieving. The size of metal powders was determined with the HIAC particle size analyser PA-720 (Pacific Scientific). Particle shape and microstructure of coatings were observed by SEM.

Figure 2:
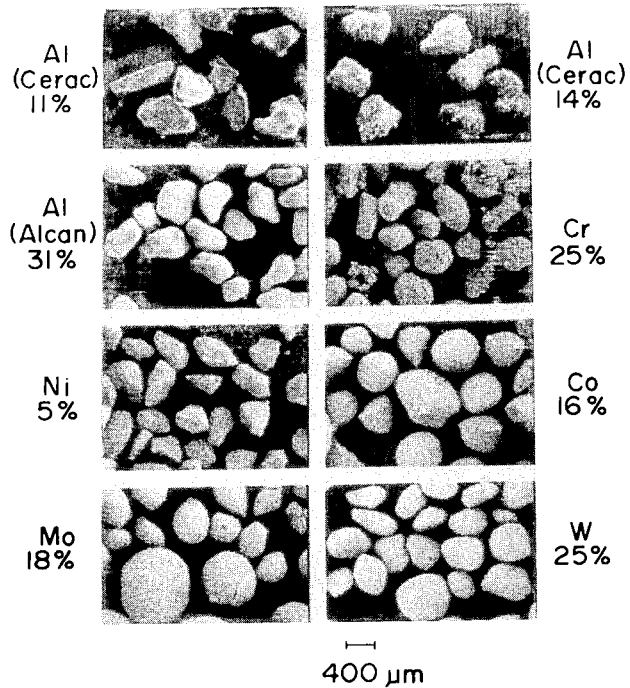
FIG. 2 shows eight $Al_2O_3$ cores coated with different metal powders.
Figure 3:
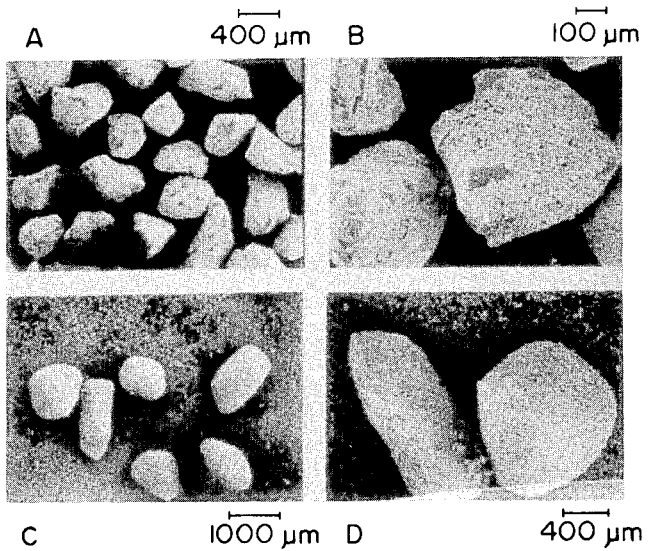
FIG. 3 shows two Ni-coated $Al_2O_3$ cores and two Ni-coated SiC cores.

$Al_2O_3$ (60 grit) cores were coated with different metal powders. The particle size of metal powders and the proportion of the coating are shown in Table 1. The volume mean diameter of metal particles was between 5 and 10 μm. The quantity of the metal powder charge was kept constant on a volume basis in order to make comparisons on the efficiency of the coating process. The typical appearance of the resulting coated cores is shown in FIG. 2.

TABLE I

RESULTS OF AGGLUTINATION COATING** ON $Al_2O_3$ CORES WITH VARIOUS METAL POWDERS.

| Metal Powder | Volume mean Diameter (μm) | Charge (g) $Al_2O_3$ # | Charge (g) Metal # | Metal content Me/(Me + $Al_2O_3$) (Vol. %) Charge | Metal content Me/(Me + $Al_2O_3$) (Vol. %) Product |
|---|---|---|---|---|---|
| Al (Cerac) | 10.4 | 20 | 3 | 19 | 11 |
| Al (Cerac) | 10.4 | 20 | 6 | 31 | 14 |
| Al (Alcan) | 8.3 | 20 | 6 | 31 | 31 |
| Cr | 6.1 | 20 | 16 | 32 | 25 |
| Cr* | — | 20 | 16 | 32 | 24 |
| Ni | 8.7 | 20 | 20 | 32 | 5 |
| Co | 7.1 | 20 | 20 | 32 | 16 |
| Mo | 7.1 | 20 | 23 | 32 | 18 |
| W | 4.6 | 20 | 43 | 31 | 25 |

*Cr particles above 38 μm were removed by sieving.
Sample: $Al_2O_3$ (60 grit, Carbowax 5 wt %). Metal particles (no binder).
**Container: cylinder II, Tilt angle: 45°.
Rotation speed: 40 rpm, Temp.: 70° C., Time: 10 min.

The coating efficiencies of metal powders are in the following sequence: Al (Alcan), Cr=W, Co=Mo, Al (Cerac), Ni. Al (Cerac) powders yielded perfect coating in spite of its low amount which probably resulted from their flaky particles. Al flakes were agglutinated in lamellae on $Al_2O_3$ surface. Since Cr powder contained may large particles, the surface of the coating was rough. Even if large metal particles above 38 μm were removed, the amount of Cr coating changed little (Table 1). It has been observed that Cr particle of about 50 μm diameter can be agglutinated on 250 μm $Al_2O_3$ cores.

The effects of paraffin and Carbowax binders were studied with the $Al_2O_3$-Al (Alcan) system. The results are shown in Table II. The proportion of coating produced during the agglutination is about the same for both binders. Most of Al powder was agglutinated onto $Al_2O_3$ cores forming a perfect coating. A similar effect was also observed with Co and Mo. $Al_2O_3$ cores coated with paraffin have lower flowing characteristics.

TABLE II

EFFECT OF PARAFFIN AND CARBOWAX IN THE $Al_2O_3$-AL SYSTEM.

| Binder | Melting point (°C.) | Metal content Al/(Al + $Al_2O_3$) (vol. %) Charge* | Metal content Al/(Al + $Al_2O_3$) (vol. %) Product | Observation |
|---|---|---|---|---|
| Paraffin (Cerac) | 52 | 48 | 47 | Perfect coating including large spheres |
| Paraffin (Cerac) | 67 | 48 | 47 | |
| Carbowax | 58 | 48 | 47 | Perfect coating |

*Sample: $Al_2O_3$ (60 grit, binder 5 wt %) 20 g, Al (Alcan, no binder) 12 g.

The other conditions were the same as in Table 1.

TABLE III

EFFECT OF THE SIZE OF CERAMIC CORES ON THE AGGLUTINATION OF Al AND Ni.

| Ceramic Core | Core size (μm) | Temp. (°C.) | Charge* (g) $Al_2O_3$ | Charge* (g) SiC | Charge* (g) Ni | Charge* (g) Al | Metal content Me/(Me + Ceramic) (Vol. %) Charge | Metal content Me/(Me + Ceramic) (Vol. %) Product |
|---|---|---|---|---|---|---|---|---|
| $Al_2O_3$ (60 grit) | 180– | 70 | 20 | — | 20 | — | 32 | 5 |
| SiC (24 grit) | 500–1000 | 60 | — | 10 | 12 | — | 31 | 19 |
| SiC (24 grit) | 500–1000 | 65 | — | 10 | — | 5 | 38 | 38 |
| SiC (24 grit) | 500–1000 | 65 | — | 10 | — | 10 | 55 | 55 |
| SiC (150 grit) | 75–106* | 65 | — | 10 | — | 10 | 55 | 49 |
| SiC (150 grit) | 75–106* | 80 | — | 10 | — | 10 | 55 | 53 |
| SiC (320 grit) | 32–45* | 65 | — | 10 | — | 10 | 55 | 39 |
| SiC (320 grit) | 32–45 | 85 | — | 10 | — | 10 | 55 | 35 |

*Sample: $Al_2O_3$ (60 grit) and SiC (24, 150, 320 grit) (Carbowax 5 wt %). Ni and Al (Alcan) (no binder).
Container: cylinder I for SiC (24 grit) - Ni system, cylinder II for the others.
Titl angle: 45°, rotation speed: 40 rpm, Time: 5–10 min.

The coating of nickel is one of the most difficult to perform. The effects of paraffin, Carbowax and Al-stearate added to the Ni powder were thus investigated with $Al_2O_3$ cores. The results are shown in Table IV. For a 1 wt. % addition of paraffin or Carbowax to Ni powder, the increase in the mass of the Ni coating was small for paraffin-doped $Al_2O_3$ cores. The contents of paraffin and Carbowax in the Ni powder were increased up to 5 wt. % for Carbowax- doped $Al_2O_3$ cores. In this case, Ni coating apparently increased, but the Ni coating powder. The addition of Al-stearate to the Ni powder increased the thickness of the coating. However, the Ni coating on paraffin-doped $Al_2O_3$ cores was imperfect. On the other hand, Ni coating on Carbowax-doped $Al_2O_3$ cores became nearly perfect for Ni coating above 9 vol. %.

TABLE IV

EFFECT OF ADDITIVES TO METAL POWDERS IN $AL_2O_3$ - NI SYSTEM.

| Binder on $Al_2O_3$ Binder | Binder on $Al_2O_3$ Content (wt %) | Additive to Ni Additive | Additive to Ni Content (wt %) | Temp. (°C.) | Tilt Angle (°) | Charge of particles (g) $Al_2O_3$ | Charge of particles (g) Ni | Metal content Ni/(Ni + $Al_2O_3$) (Vol. %) Charge | Metal content Ni/(Ni + $Al_2O_3$) (Vol. %) Product |
|---|---|---|---|---|---|---|---|---|---|
| Paraffin (p-52) | 5 | — | — | 60 | 45 | 12 | 3 | 10 | 5 |
| | 5 | Paraffin (p-52) | 1 | 60 | 30 | 12 | 3 | 10 | 7 |

TABLE IV-continued

EFFECT OF ADDITIVES TO METAL POWDERS IN AL₂O₃ - NI SYSTEM.

| Binder on Al₂O₃ | | Additive to Ni | | Temp. (°C.) | Tilt Angle (°) | Charge of particles (g) | | Metal content Ni/(Ni + Al₂O₃) (Vol. %) | |
|---|---|---|---|---|---|---|---|---|---|
| Binder | Content (wt %) | Additive | Content (wt %) | | | Al₂O₃ | Ni | Charge | Product |
| | 5 | Carbowax | 1 | 60 | 45 | 12 | 5 | 16 | 4 |
| | 5 | Al-stearate | 1 | 60 | 30 | 12 | 3 | 10 | 9 |
| Carbowax | 5 | — | — | 60 | 30 | 12 | 3 | 10 | 4 |
| | 5 | — | — | 70* | 45 | 20 | 20 | 32 | 5 |
| | 5 | Paraffin (p-52) | 5 | 70* | 45 | 20 | 20 | 30 | 12 |
| | 5 | Carbowax | 5 | 70* | 45 | 20 | 20 | 30 | 9 |
| | 5 | Al-stearate | 1 | 60 | 30 | 12 | 3 | 10 | 9 |
| | 5 | Al-stearate | 1 | 60 | 45 | 12 | 3 | 10 | 9 |
| | 5 | Al-stearate | 1 | 60 | 45 | 12 | 5 | 16 | 11 |
| | 5 | Al-stearate | 1 | 70* | 45 | 20 | 20 | 31 | 12 |

*Cylinder II (time 10 min.). The other runs were done using cylinder I (time 5 min.). Rotation speed: 40 rpm.

With no addition of Al-stearate many coating defects were observed on the edges of irregular shape cores, owing to the fact that edges are subjected to collisions and are left uncoated. On the other hand, Al-stearate-doped Ni powder perfectly covered irregular Al₂O₃ cores, even their edges. When undoped Fe particles were used, the resulting coating corresponded to 24 vol. % and defects were observed on the edges. On the other hand, the addition of Al-stearate to Fe powder reduced the Fe coating to 15 vol. %, but Al-stearate doped Fe powder perfectly covered SiC cores.

The addition of Al-stearate to Ni powder is effective only up to 0.2 wt. % and no further increase of the Ni coating is observed above this value.

The effect of the addition of Al-stearate to metal powder is noteworthy. Al-stearate is a surfactant and, when the molecules are adsorbed on metal particles, the long carbon chains inhibit the agglomeration of the metal powder. In the coating according to the invention, therefore, Al-stearate may improve the dispersion of metal powder giving a perfect coating on ceramic surface of cores including particle edges.

The embodiments of the invention in which an exclusive property or privilege is claimed are defined as follows:

1. a process for coating ceramic or metallic particles with fine powder selected from metal powders, ceramic powders, and carbon or plastic powders which comprises:
   a. providing a mixture comprising said particles and a binder which is capable of slowly melting to viscous state at temperatures up to about 85° C.,
   b. tumbling said mixture while slowly heating same to enable said binder to reach said viscous state while allowing said particles to be substantially covered with said binder,
   c. cooling the mixture substantially to room temperature and thereafter breaking up agglomerates that have formed during said tumbling and heating, to give individual particles covered with said binder,
   d. adding said fine powder to said individual particles covered with said binder and tumbling and heating again to said viscous state under conditions effective to provide a coating of said fine powder on said particles.

2. Process according to claim 1, which further comprises
   e. heating said coated particles to remove said binder leaving said particles exclusively coated with said fine powder.

3. Process according to claim 1, wherein said particles consist of ceramic cores selected from the group consisting of particles of oxides, borides, nitrides, silicides and carbides.

4. Process according to claim 1, wherein said particles consist of metallic cores selected from Fe, Ni, Co, Cr, Cu, Al and alloys thereof.

5. Process according to claim 1, wherein said cores have a mean diameter of about 40–5000 μm.

6. Process according to claim 1, wherein said fine powder is selected from the group consisting of fine metal powders selected from one of the element groups IVB, VB, VIB, VIII, IB, IIB, IIIA and IVA and alloys thereof.

7. Process according to claim 1, wherein said fine powder is a ceramic powder.

8. Process according to claim 5, wherein said fine metal powders have a mean diameter of 0.1–10 μm.

9. Process according to claim 1, which comprises adding a surfactant to said fine powder which will inhibit agglomeration thereof when coating said particles with said fine powder.

10. Process according to claim 9, wherein said surfactant comprises aluminum stearate.

11. Process according to claim 1, wherein said binder is selected from the group consisting of polyethylene glycol and paraffin.

12. Process according to claim 1, wherein said tumbling is carried out in a rotating cylindrical container which is tilted with respect to horizontal axis.

13. Process according to claim 1, which comprises adding about 5 to about 30 volume percent of said fine powder with respect to the volume of said particles.

14. Process according to claim 1, wherein the mixture of particles and binder comprises about 0.5 to about 5 weight percent binder.

15. Process according to claim 1, wherein heating in steps b. and c. is carried out up to a temperature of about 80° C.

16. Process according to claim 11, wherein said cooling is carried out by air blowing while said cylinder is rotating.

17. Process according to claim 9, which comprises adding less than about 0.5 weight percent surfactant.

18. A process of coating ceramic particles with fine metallic powder which comprises:
   a. providing a mixture comprising ceramic cores selected from the group consisting of $Al_2O_3$ and SiC particles, and a binder selected from the group consisting of polyethylene glycol and paraffin, said binder being present in an amount of about 0.5 to about 5 weight percent of said ceramic cores, said binder being capable of reaching viscous state below about 80° C.,
   b. tumbling said mixture in a rotating cylindrical container which is tilted with respect to horizontal axis, while heating said mixture to a temperature up to about 80° C. to enable said binder to reach said viscous state, and allowing said particles to be substantially covered with said binder,
   c. cooling the mixture of binder covered particles substantially to room temperature and thereafter breaking up particles that may have agglomerated during said tumbling and heating by tumbling same with ball means, to give individual particles covered with said binder,
   d. adding a fine metal powder selected from the group consisting al Al, Cr, Fe, Ni, Co, Mo and W to said individual particles covered with binder and tumbling and heating again in said rotating cylindrical container at a temperature up to about 80° C. to said viscous state under conditions effective to provide a coating of said fine metallic powder on said particles.

19. A process for coating particles with fine powder which comprises:
   a. providing a mixture comprising said particles and a binder which is capable of slowly melting to viscous state,
   b. tumbling said mixture while slowly heating same to enable said binder to reach said viscous state while allowing said particles to be substantially covered with said binder,
   c. cooling the mixture substantially to room temperature and thereafter breaking up particles that may have agglomerated during said tumbling and heating, to give individual particles covered with said binder,
   d. adding said fine powder to said individual particles covered with said binder and tumbling and heating again to said viscous state under conditions effective to provide a coating of said fine powder on said particles, and
   e. heating said coated particles to remove said binder leaving said particles exclusively coated with said fine powder.

* * * * *